(12) United States Patent
Stevens et al.

(10) Patent No.: US 10,968,626 B2
(45) Date of Patent: Apr. 6, 2021

(54) ACOUSTIC AND INSULATION MOUNTING

(71) Applicant: Studco Australia Pty Ltd., Croydon South (AU)

(72) Inventors: Ben Stevens, Croydon South (AU); Nigel Ryan Grimshaw, Croydon South (AU); Simon McKechnie, Croydon South (AU)

(73) Assignee: Studco Australia Pty Ltd.

( * ) Notice: Subject to any disclaimer, the term of this patent is extended or adjusted under 35 U.S.C. 154(b) by 0 days.

(21) Appl. No.: 16/849,371

(22) Filed: Apr. 15, 2020

(65) Prior Publication Data
US 2020/0240135 A1  Jul. 30, 2020

Related U.S. Application Data

(63) Continuation of application No. 15/903,782, filed on Feb. 23, 2018, now abandoned.

(30) Foreign Application Priority Data

Dec. 22, 2017 (AU) .............................. 2017905175

(51) Int. Cl.
| | | |
|---|---|---|
| *E04B 1/84* | (2006.01) | |
| *E04B 1/41* | (2006.01) | |
| *E04B 1/82* | (2006.01) | |
| *F16F 1/373* | (2006.01) | |
| *F16F 1/38* | (2006.01) | |
| *E04B 1/38* | (2006.01) | |
| *F16F 13/10* | (2006.01) | |

(52) U.S. Cl.
CPC ............... *E04B 1/84* (2013.01); *E04B 1/40* (2013.01); *E04B 1/4178* (2013.01); *E04B 1/82* (2013.01); *F16F 1/3735* (2013.01); *F16F 1/3849* (2013.01); *E04B 2001/405* (2013.01); *E04B 2001/8263* (2013.01); *F16F 13/10* (2013.01)

(58) Field of Classification Search
CPC ........ E04B 1/84; E04B 1/40; E04B 2001/405; E04B 2001/8263; E04B 2001/7679; F16F 15/08
See application file for complete search history.

(56) References Cited

U.S. PATENT DOCUMENTS

| | | | | |
|---|---|---|---|---|
| 2,115,238 A * | 4/1938 | Stevens | ..................... | E04B 1/84 52/402 |
| 3,971,881 A * | 7/1976 | Hawkins | ................ | H02G 7/125 174/42 |
| 7,416,174 B2 * | 8/2008 | Dickson | .................. | F16F 15/08 267/141.1 |
| 9,027,527 B2 * | 5/2015 | Higashi | ................. | F16F 1/3713 123/198 R |

* cited by examiner

*Primary Examiner* — Patrick J Maestri
(74) *Attorney, Agent, or Firm* — Woods Oviatt Gilman LLP; Katherine H. McGuire, Esq.

(57) ABSTRACT

A mounting for acoustically insulating a first building component from a second building component, said mounting having a first insulating portion extending around a fastener, a second insulating portion extending around said fastener, a neck insulating portion extending between said first insulating portion and said second insulating portion, such that a shaft of the fastener is covered by one or more of the insulating portions between the first building component and the second building component.

4 Claims, 3 Drawing Sheets

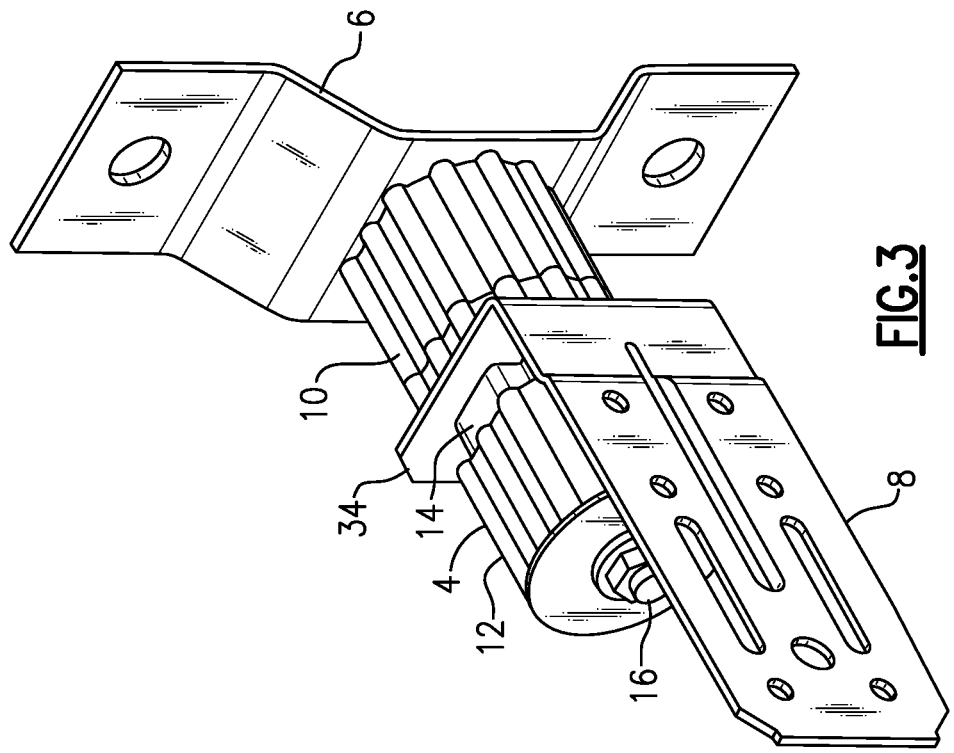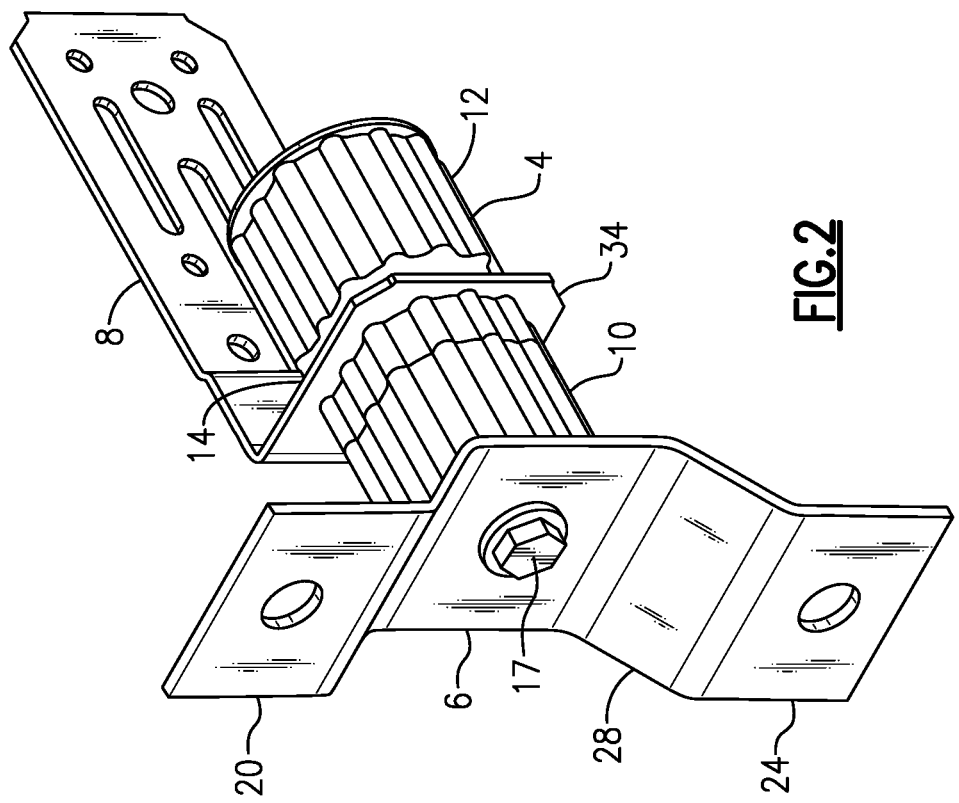

ACOUSTIC AND INSULATION MOUNTING

FIELD OF THE INVENTION

This invention relates to a mounting which is used to isolate two components and more particularly relates to a mounting used to acoustically insulate and isolate two building components in a building.

BACKGROUND OF THE INVENTION

In order to reduce structure-borne vibrations and airborne noise between a pair of building components, such as a primary masonry wall and a secondary framed wall, when those two walls require support bridging connection between them for structural purposes, a mounting, consisting of brackets and rubber washers or pads have been mounted on a bolt, connecting the two building components together. A particular problem arises with the order in which the brackets, bolt and rubber elements are assembled, being that if a piece of construction debris, such as a small piece of timber, or a loose construction element, such as a stray fastener, lodges itself between one building component and the mounting, it inadvertently short circuits the isolation properties of the mounting and negates the intended attenuation of the vibration of noise, causing loss of amenity and function through noise annoyance.

Furthermore, some arrangements require the installer to interact with, adjust or affix the assembly bolt, either as the means by which the building component is connected to the mounting, or as a mechanism to adjust the distance between the building component and the mounting. The assembly bolt is generally tightened at the manufacturer's premises in a controlled environment to a precise value to ensure the compression of the rubber isolation elements is correct. The compression amount is highly critical to the acoustic performance of such mountings and any uncontrolled variation to the compression amount by way of the on-site installer interacting with the assembly bolt is likely to have a detrimental effect on the acoustic performance of the entire building.

The present invention seeks to overcome any one or more of the above disadvantages by providing a mounting that improves the acoustic and vibration isolation between two building components, eliminates the risk of the isolation elements being ineffective, and removes the need for the installer to interact directly with the assembly bolt that is critical to the isolation performance of the mounting.

SUMMARY OF THE INVENTION

According to a first aspect of the invention, there is provided a mounting for acoustically insulating a first building component from a second building component, said mounting having:
- a first insulating portion extending around a fastener;
- a second insulating portion extending around said fastener;
- a neck insulating portion extending between said first insulating portion and said second insulating portion;
such that a shaft of the fastener is covered by one or more of the insulating portions.

According to an embodiment of the invention the first building component is a primary bracket for connection to a primary building component; such as a wall and the second building component is a secondary bracket for connection to the secondary building component. The fastener may be an assembly bolt that connects all the elements together, that is the primary and secondary brackets and the first and second insulating portions and neck of the mounting. Preferably the only uninsulated connection of the assembly bolt to the mounting is between the assembly bolt and the primary bracket. Preferably a fixing surface of the secondary bracket is perpendicular to a fixing surface of the primary bracket.

Preferably the neck insulating portion fits through an aperture in the secondary bracket, said secondary bracket having two sections perpendicular to one another, one section having the aperture and the other section providing connection to the secondary building component.

The first insulating portion may extend between the primary bracket and said one section of the secondary bracket. Preferably at least the first insulating portion is substantially circular in cross-section and has a series of alternating ribs and grooves around the outer surface of the first insulating portion.

Preferably the primary bracket that has a raised portion, such that when the primary bracket is connected to the secondary bracket through the fastener, a head of the fastener abuts against a rear surface of the raised portion of the primary bracket.

Preferably the mounting is dimensioned to provide a gap between the primary bracket and the secondary bracket and wherein the fastener is insulated by said mounting from the secondary bracket.

BRIEF DESCRIPTION OF THE DRAWINGS

A preferred embodiment will hereinafter he described, by way of example only, with reference to the drawings which:

FIG. 2 is a perspective view from behind of the mounting of FIG. 1;

FIG. 3 is a further perspective view from above of the mounting shown in FIG. 1.

DETAILED DESCRIPTION OF THE PREFERRED EMBODIMENT

Figure 1:
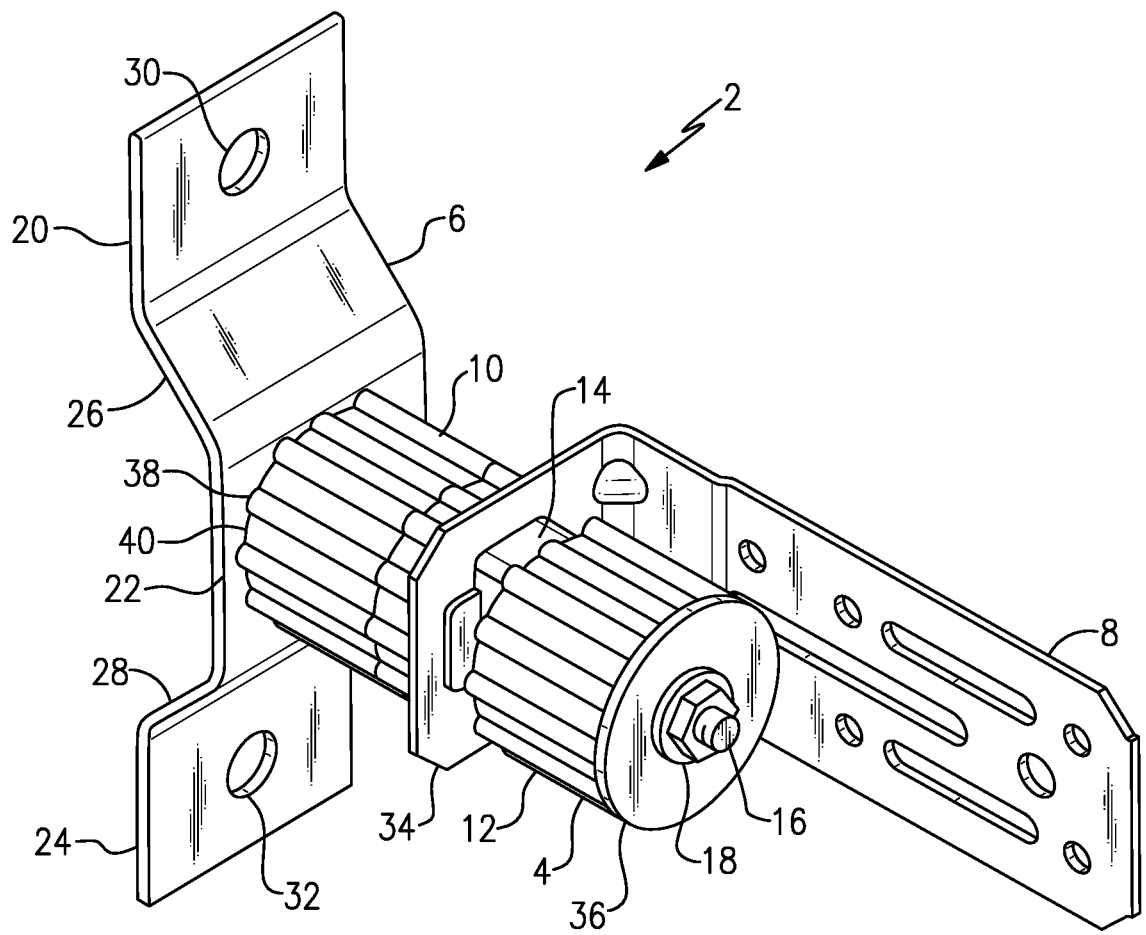
FIG. 1 is a perspective view from above of a mounting that connects two building components.

Referring to FIGS. 1 to 3 there is shown apparatus 2 including a mounting 4 for acoustically insulating a first building component or member 8, in the form of a primary or first bracket, from a second building component or member 6, in the form of a secondary or second bracket. The mounting 4 comprises a first insulating portion 10 and a second insulating portion 12, each of which are connected to one another through a neck insulating portion 14. The bracket 8 can be any particular bracket, however in this instance it is an angled bracket and more particularly a right angled bracket. It has a section 34 having an aperture through which the neck insulating portion 14 fits tightly. The bracket 8 is connected to bracket 6 through a fastener such as an assembly bolt 16 that has a nut 18 which tightens against plate 36. The bolt 16 has its head 17 against the inside surface of bracket 6 and more particularly the inside surface of raised section 22. This allows space to access the head 17 of the fastener. The remainder of the bracket 6 has two flat portions 20 and 24 which respectively have apertures 30 and 32 to enable bracket 6 to be fastened to a primary building component such as a wall 44 or other similar structure through fasteners 52 and 50 which protrude respectively through apertures 30 and 32. The bracket 8 can alternatively be connected directly to another type of building component. Each of portions 10 and 12 have raised ribs 38 and grooves 40, each groove being located in between each raised rib on an outer surface of portion 10 and 12.

Figure 4:
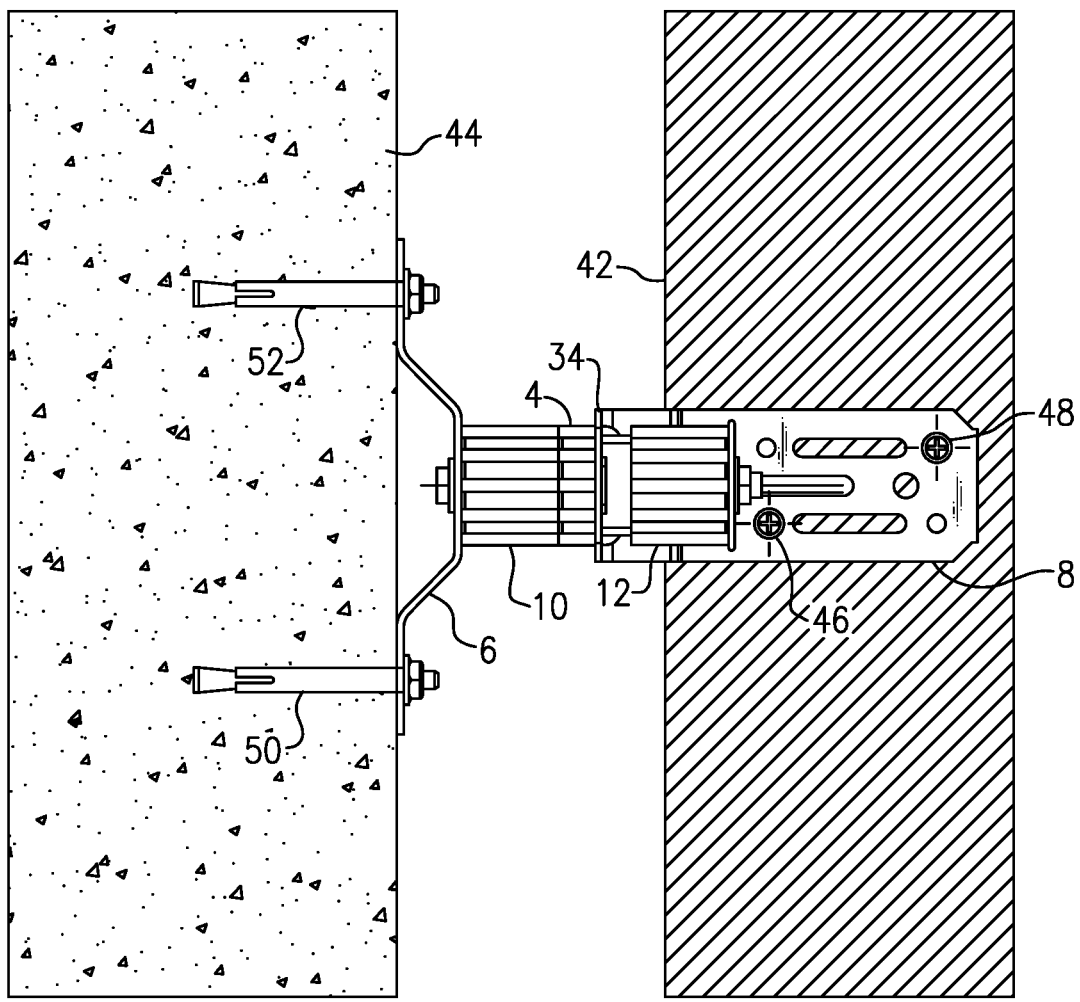
FIG. 4 is a side view showing the connection of each building component through the mounting.

It is seen that a portion of the mounting 4, that is the first insulating portion 10 separates the two brackets 6 and 8 to provide a space therebetween and the bracket 8 has a 90° bend to enable the attachment thereto of an upright member or secondary building component such as stud 42 through fasteners 46 and 48 (refer to FIG. 4). This space also prevents any unwanted short circuiting that might otherwise occur through a metal piece of material lodging in this space accidentally and touching an otherwise exposed shaft of fastener 18. The space created also enables acoustic and vibrational isolation between the two building components 6 and 8. The mounting 4 is made of rubber that is able to be compressed.

The arrangement shown in the various FIGS. 1 to 4 enables the primary building component, such as a wall to be offset from the secondary building component such as a stud, also to be at 90° or perpendicular to it and importantly not have any contact with the stem or shaft of fastener 18, due to the separation of the bracket 8 and the fastener 18 through the mounting 4.

The invention claimed is:

1. A mounting assembly for providing acoustic insulation between primary and secondary building components having respective mounting surfaces which extend at an angle to each other, said mounting assembly comprising:
   a first building component configured to fasten to the mounting surface of the primary building component;
   a second building component, said second building component being a right angle bracket having a first section with an aperture and a second section configured to fasten to the mounting surface of the secondary building component;
   a fastener having a shaft, said fastener connecting said first building component to said second building component in spaced relation to each other;
   a compressible first insulating portion extending around said fastener shaft between said first building component and said first section of said second building component;
   a compressible second insulating portion extending around said fastener shaft in spaced relation to said second section of said second building component; and
   a compressible neck insulating portion extending between said first insulating portion and said second insulating portion, said neck insulating portion extending through said aperture in said second section of said second building component.

2. A mounting assembly according to claim 1 wherein at least the first insulating portion is substantially circular in cross-section and has a series of alternating ribs and grooves around the outer surface of the first insulating portion.

3. The mounting assembly according to claim 1 wherein the first building component is a primary bracket that includes a raised portion between first and second flat portions with said first and second flat portions configured to fasten to the mounting surface of the primary building component with said raised portion extending in spaced relation to the mounting surface of the primary building component, wherein said fastener includes a head portion which abuts against a rear surface of the raised portion of the first building component which faces the mounting surface of the primary building component and does not extend beyond a plane defined by said first and second flat portions, whereby said head of said fastener is spaced from the mounting surface of the primary building component when said mounting assembly is fastened to the respective mounting surfaces of the primary and secondary building components.

4. The mounting according to claim 3 and further including a plate with an aperture, said plate configured to mount to the end of said second insulating component located opposite said neck insulating portion with said fastener shaft extending through said plate aperture, and further including a nut configured to removably attach to the end of said shaft which is configured to extend through said plate aperture and thereby secure said fastener, said first insulating portion, said second insulating portion and said neck insulating portion to said first and second building components, wherein the mounting is dimensioned to provide a gap between the first building component and the second building component and wherein the fastener is insulated by said mounting from the second building component.

\* \* \* \* \*